June 28, 1932.  P. S. ECKLAND ET AL  1,864,644
TRANSMISSION SHIFTING DEVICE FOR VEHICLES HAVING TWO ENGINES
Filed Dec. 23, 1929   3 Sheets-Sheet 2
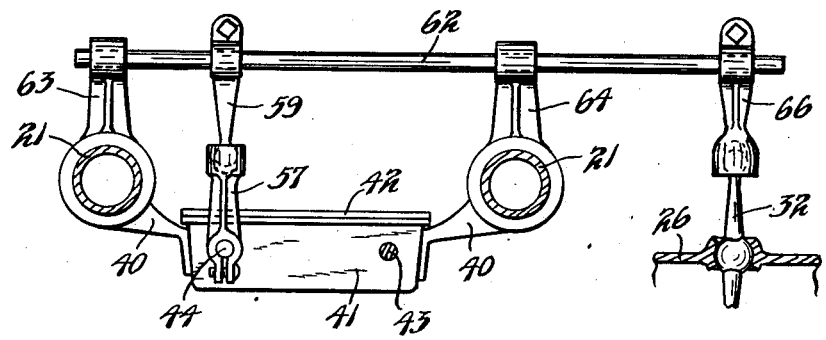
INVENTORS.
PETER S. ECKLAND
GUNNAR RYDEN.
BY THEIR ATTORNEYS.

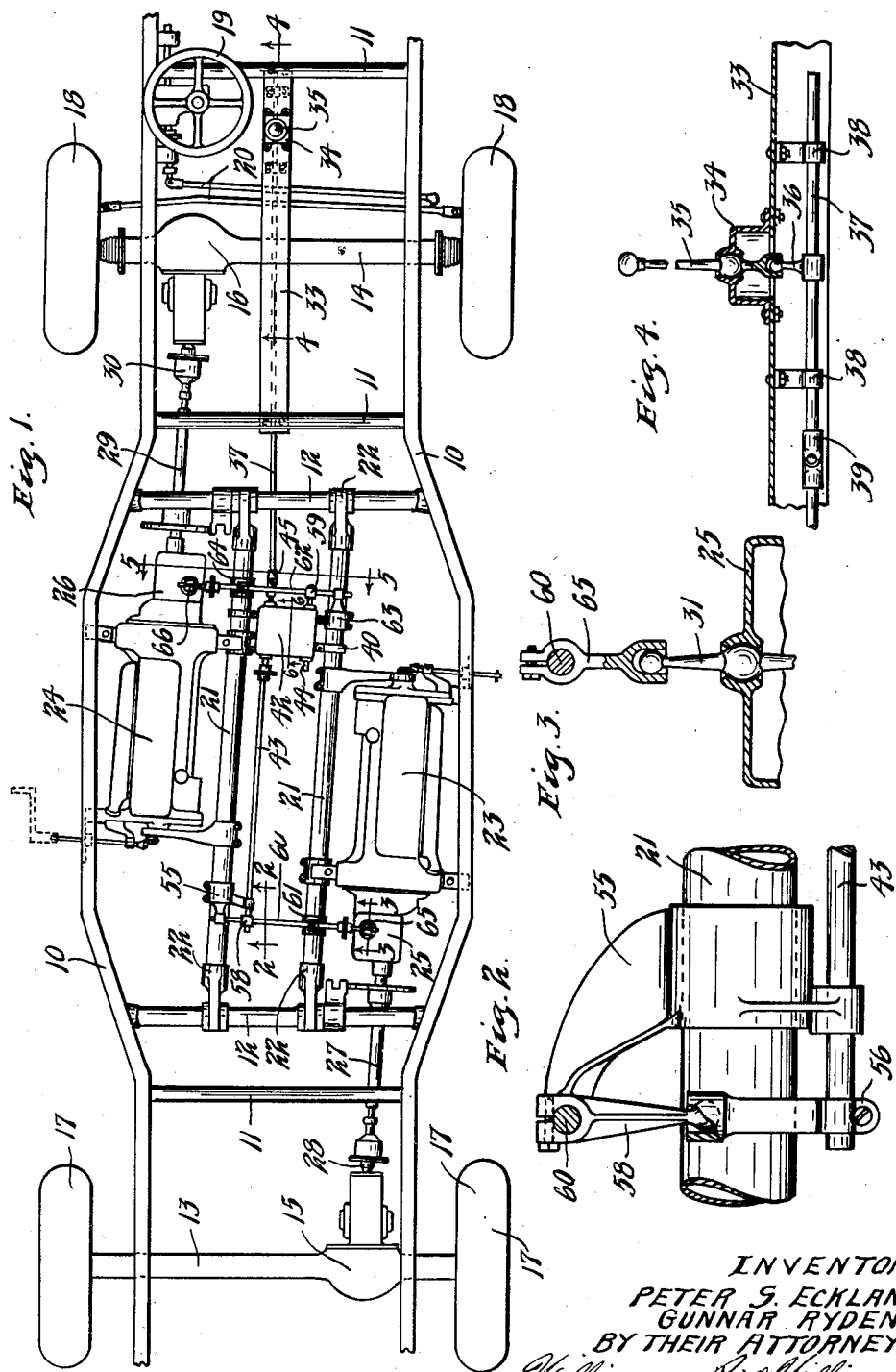

June 28, 1932. P. S. ECKLAND ET AL 1,864,644
TRANSMISSION SHIFTING DEVICE FOR VEHICLES HAVING TWO ENGINES
Filed Dec. 23, 1929 3 Sheets-Sheet 3
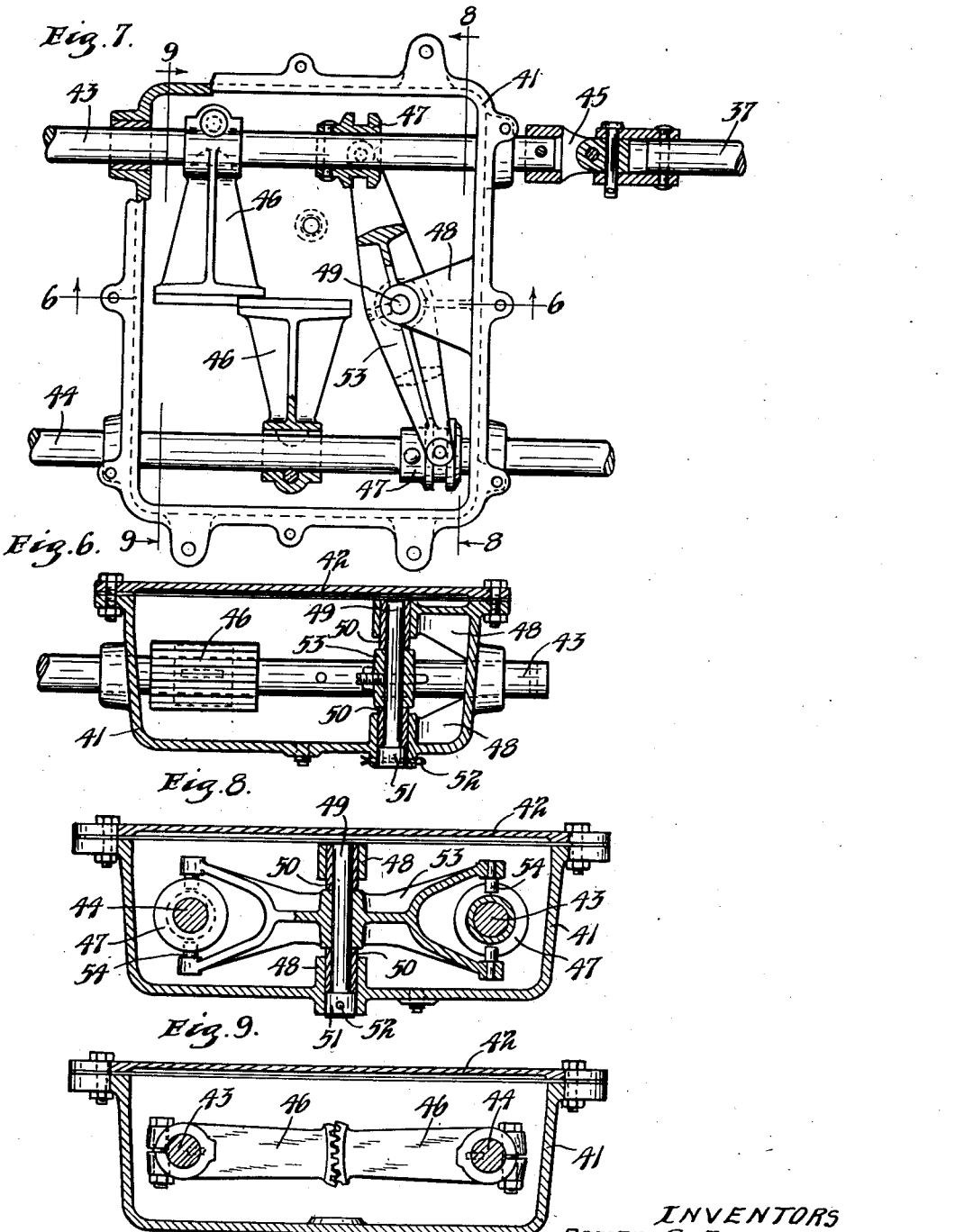
INVENTORS
PETER S. ECKLAND.
GUNNAR RYDEN.
BY THEIR ATTORNEYS.

Patented June 28, 1932

1,864,644

UNITED STATES PATENT OFFICE

PETER S. ECKLAND AND GUNNAR RYDEN, OF MINNEAPOLIS, MINNESOTA, ASSIGNORS TO ECKLAND BROS. COMPANY, OF MINNEAPOLIS, MINNESOTA, A CORPORATION OF MINNESOTA

TRANSMISSION SHIFTING DEVICE FOR VEHICLES HAVING TWO ENGINES

Application filed December 23, 1929. Serial No. 416,102.

This invention relates to mechanical movements and also to devices for simultaneously shifting variable speed transmissions of a pair of engines in a wheeled vehicle.

It is an object of this invention to provide novel means for transmitting a combined longitudinal and rotary movement from one shaft to a second shaft is an inverse direction.

A further object of the invention is to provide in a wheeled vehicle the combination of a first engine adapted to drive the rear wheels of the vehicle, a second engine adapted to drive the front wheels of the vehicle, variable speed transmissions from the two engines to the rear and front wheels respectively, and means for simultaneously shifting said two transmissions to cause the front and rear wheels to be rotated in the same direction and at the same gear ratio relative to the two engines, when the engines are running.

To these ends, the invention consists in the novel parts and novel combinations of parts, hereinafter defined in the claims and described in the following specification, made in connection with the accompanying drawings, wherein like reference characters refer to the same or similar parts throughout the various views, and, in which, Fig. 1 is a plan view of the main portions of a chassis of a wheeled vehicle equipped with two engines, one adapted to drive the rear wheels and one adapted to drive the front wheels, with an embodiment of the present invention applied thereto;

Fig. 2 is a vertical section taken on the line 2—2 of Fig. 1, as indicated by the arrows;

Fig. 3 is a vertical section taken on the line 3—3 of Fig. 1, as indicated by the arrows;

Fig. 4 is a vertical section taken on the line 4—4 of Fig. 1 as indicated by the arrows;

Fig. 5 is a vertical section taken on the line 5—5 of Fig. 1, as indicated by the arrows;

Fig. 6 is a vertical section taken on the lines 6—6 of Fig. 1 and Fig. 7;

Fig. 7 is a plan view of the parts illustrated in Fig. 6 with the top of the casing removed;

Fig. 8 is a vertical section taken substantially on the line 8—8 of Fig. 7, as indicated by the arrows, and Fig. 9 is a vertical section taken on the line 9—9 of Fig. 7, as indicated by the arrows.

Referring to the drawings, portions of the chassis of a four wheel drive motor bus are illustrated, which include the two side frames 10 generally disposed parallel to each other, but bulged outwardly from each other at their central portions, cross bars 11 connecting the forward and rear portions of the side frames 10, two cross bars 12 connecting the outwardly bulged portions of the side frames 10, rear axle 13, front axle 14, rear differential 15, front differential 16, rear wheels 17, front wheels 18 adapted to be both steered and driven, steering wheel 19 and steering mechanism 20 for steering the front wheels 18 of the vehicle. The two cross bars 12 are connected together by a pair of bars 21 fitting at their ends in sockets 22 secured to the cross bars 12, the said bars 21 being disposed in parallel relation and extending generally longitudinally of the chassis but being disposed at their forward ends in closer spaced relation to the right side frame 10 than to the left side frame and being disposed at their rear ends in more closely spaced relation to the left side frame 10 than to the right side frame 10. Accordingly, the two bars 21, although disposed in the same horizontal plane, are inclined slightly relative to the longitudinal central axis of the vehicle. Suitably supported from the right bar 21 and right side frame 10 is a gasoline engine 23 for driving the rear wheels of the vehicle. The engine 23 is disposed to face in the same general direction relative to the vehicle that an ordinary rear wheel drive automobile engine faces and the engine 23, accordingly, can be considered to face forwardly. A second gasoline engine 24 is suitably supported from the left bar 21 and the left side frame 10 and this engine is adapted to drive the front wheels of the vehicle. The engine 24 faces in a direction generally opposite to the normal direction that an engine for a rear wheel drive automobile engine usually faces and, accordingly, the engine 24 can be considered to face rearwardly relative to the present vehicle. Each of the engines 23 and 24 have variable speed transmissions to the rear axle 13 and to the front axle 14 respectively, the gear shift casings of which are designated 25 and 26 respectively. The propeller shaft for the forwardly facing engine 23 extends from the gear shift casing 25 rearwardly to the rear differential 15, and is designated by the numeral 27, there being a universal joint 28 incorporated in the said propeller shaft. The propeller shaft 29 from the rearwardly facing engine 24 extends forwardly from the gear shift casing 26 to the forward differential 16 and has incorporated therein a universal joint 30. The two gear shifts (not illustrated) of the two engines 23 and 24 enclosed in the gear shift casings 25 and 26 respectively, may be of standard type and operated by means of motion imparted thereto from gear shift levers 31 and 32 respectively, the lever 31 being adapted to shift the gears in the variable speed transmission for the engine 23 and the lever 32 being adapted to shift the gears in the variable speed transmission for the engine 24. The two levers 31 and 32 are provided with balls at their upper ends and they are also provided with balls at their fulcrum portions fitting within ball sockets formed at the upper sides of the gear shift casings 25 and 26 respectively. The levers 31 and 32 will be capable of universal pivotal movement in the same manner that an ordinary gear shift lever of standard construction is capable of movement and the gears of the gear shifts will be operated in the usual manner from the shift levers 31 and 32.

A channel-shaped member 33 extends in the center of the chassis between the two front cross bars 11, and the open side of this channel-shaped member is downwardly disposed. An opening is cut through the horizontal flange of the member 33 adjacent the steering wheel 19 and applied over this opening is a casing 34 forming a ball socket within which the fulcrum ball of a main gear shift lever 35 is seated. The upper end of the said lever projects upwardly and terminates in a handle adjacent the wheel 19 adapted to be conveniently grasped for operation of the lever by the driver of the vehicle. The lever 35 projects downwardly below the casing 34 and terminates in a ball socket within which a ball at the upper end of an arm 36 fits. The arm 36 is secured to a rod 37 extending longitudinally of the chassis and mounted for both sliding and rotative movement in bearings 38 fixed to the member 33. The rod 37 is formed in two sections, the forward section being connected to the rear section by means of a forward universal joint 39. Extending preferably between forward portions of the two bars 21 and supported therefrom, as by means of straps 40, is a rectangular gear casing 41 having a cover plate 42. The gear casing 41 has spaced hubs at its forward and rear sides within which a pair of spaced parallel shafts 43 and 44 respectively, are journaled for both sliding and rotative movement. The two shafts 43 and 44 extend generally longitudinally of the chassis and specifically they extend parallel to the bars 21 and the crank shafts of the two engines 23 and 24. The rod 37 is connected at its rear end by a universal joint 45 to the forward end of the shaft 43 outside the casing 41. Secured to the two shafts 43 and 44 are a pair of oppositely disposed segment gears 46 having their teeth in mesh with each other, the teeth of the gears being quite wide to permit of sliding movement of the two shafts 43 and 44 in opposite directions relative to each other for a limited distance, while the teeth of the two gears are still in mesh. Also secured to the two shafts 43 and 44 respectively, are two grooved rings 47, the said rings being so positioned on the two shafts that when all portions of the teeth of the two gears 46 are in engagement, the two rings 47 are disposed directly opposite each other. Projecting inwardly from one side of the casing 41 centrally between the two shafts 43 and 44 as from the forward side of the casing, are a pair of vertically apertured ears 48 having journaled therein a vertical pivot pin 49, there being upper and lower bushings 50 surrounding the pin and secured to the ears 48. An apertured boss is formed at the bottom of the casing 41 below the lower ear 48 and a plug 51, disposed below the lower end of the pin 49 and the lower bushing, fits within the aperture of the boss and is secured thereto as by means of a cotter pin 52. Fixed to the pin 49 between oppositely disposed ends of the bushings 50 is a shipper lever 53, the pin 49 running through a central apertured hub in the lever. The shipper lever is centrally pivoted for swinging movement in the horizontal plane of the two shafts 43 and 44 and is forked at its two ends to straddle the grooved rings 47 and the forked ends of the lever carry oppositely disposed pins 54 which project into the grooves of the rings. The shipper lever 53, accordingly, acts in conjunction with the rings 47 to cause the shaft 44 to be slid in one direction when the shaft 43 is slid in an opposite direction. The segment gears 46 act to cause the shaft 44 to be rotated in one direction when the shaft 43 is rotated in an opposite direction. With the mechanism above described and including the two shafts 43 and 44, the two segment gears 46, the shipper lever 53 and the grooved rings 47, it will be seen that a combined sliding and rotary motion can be transmitted from the shaft 43 in an inverse direction to the shaft 44.

The shaft 43 extends rearwardly from the gear casing 41 and is journaled adjacent its rear end in a hub formed on a bearing bracket 55 secured to the bar 21 adjacent its rear end. Fixed to the rear end of the shaft 43 is an arm 56 projecting upwardly from the shaft and having a ball socket formed therein at its upper end. The shaft 44 projects forwardly from the gear casing 41 for a short distance and similarly secured to the forward end of the shaft 44 is an upwardly projecting arm 57 corresponding to the arm 56 and having a ball socket formed at its end. Fitting within the socket of arm 56 is a ball carried at the lower end of an arm 58, while similiarly fitting within the socket of the arm 57 is a ball carried at the lower end of an arm 59. The arm 58 is secured to a rear shaft 60 mounted for both rotary and sliding movement in a hub of the bracket 55 and a hub of a bracket 61 secured to the right bar 21 adjacent its rear end. The arm 59 is similarly secured to a forward shaft 62 mounted for sliding and rotary movement in the hub of a bracket 63 secured to the right bar 21 adjacent its forward end and the hub of a bracket 64 secured to the left bar 21 adjacent its forward end. The two shafts 60 and 62 are parallel to each other and extend generally transverse to the chassis of the vehicle and specifically at right angles to the shafts 43 and 44. The shaft 60 extends to a point above the upper end of the gear shift lever 31, while similarly the shaft 62 extends to a point above the upper end of the gear shift lever 32. A downwardly projecting arm 65 is secured to the right end of the shaft 60 and this arm has a ball socket formed at its lower end within which the ball on the upper end of the gear shift lever 31 fits. Similarly the shaft 62 carries at its left end a downwardly projecting arm 66 having formed thereon a ball socket at its lower end within which fits the ball at the upper end of the gear shift lever 32.

Operation

When it becomes desirable, during operation of the vehicle equipped with the present device, to shift gears of the two variable speed transmissions for the engines 23 and 24, the driver of the vehicle will merely operate the main gear shift lever 35 of the vehicle in the usual manner for shifting gears in a standard automobile, and the gears in the two transmissions for the engines 23 and 24 will be simultaneously operated to cause the rear wheels 17 and the front wheels 18 to be driven in the same direction and in the same gear ratio relative to the engines 23 and 24 respectively. Let us consider, for example, that the driver of the vehicle wishes to shift the two transmissions of the engines 23 and 24 from low gear to second gear and that when the vehicle is being driven in low gear, the gear shift lever 31 is tilted rearwardly and to the left and the gear shift lever 32 is correspondingly tilted forwardly and to the right, while to shift to the second gear, the gear shift lever 31 should be carried forwardly and to the right and gear shift lever 32 should be carried correspondingly rearwardly and to the left. The main and controlling gear shift lever 35 when the levers 31 and 32 are disposed to operate the transmissions in low gear will be disposed forwardly and to the right and in order to shift the levers 31 and 32 from low to second gears, the controlling lever 35 will be moved rearwardly and to the left. As the controlling gear shift lever 35 is moved, motion will be imparted from the same through the socket at the lower end thereof and the arm 36 to the rod 37 to rotate the rod 37 to the right and to slide the rod 37 forwardly. The shaft 43 will, of course, be moved in the same manner that the rod 37 is moved and will rotate in a counter clockwise direction as viewed in Fig. 8 and slide forwardly. As the shaft 43 moves, the arm 56 will be swung to the right and slid forwardly. Motion will be imparted from the arm 56 to the arm 58 and thence to the shaft 60 to slide the shaft 60 to the right and to rotate the shaft 60 rearwardly or in a counter-clockwise direction as viewed in Fig. 2. The arm 65 will, of course, move in the same manner as the shaft 60 and it will transmit movement to the gear shift lever 31, for the engine 23 driving the rear wheels, to cause the upper end of the lever 31 to be moved to the right and forwardly, thereby causing the transmission for the engine 23 to be shifted from low to second gear.

As the shaft 43 turns to the left in a counter-clockwise direction, as viewed in Fig. 8, and slides forwardly, motion will be transmitted from the shaft 43 to the shaft 44 through the segment gears 46 to rotate the shaft 44 to the left or in a clockwise direction, as viewed in Fig. 8. Also the shipper lever 53 and grooved rings 47 will transmit motion from shaft 43 to shaft 44 to slide the shaft 44 in a rearward direction. A combined rotary motion to the left and a sliding motion rearwardly will thus be transmitted to the shaft 44 and the arm 57 will be similarly moved with the shaft. Motion will be transmitted from the arm 57 to the arm 59 and thence to the shaft 62 to slide the shaft 62 to the left and rotate the same forwardly or in a clockwise direcion, as viewed in Fig. 1. The arm 66 will, of course, be moved rearwardly and to the left with the shaft 62, and will transmit movement to the upper end of the shift lever 32 to move the same rearwardly and to the left. This movement of the gear shift lever 32 will cause the gears in the transmission for the engine 24, driving the forward wheels, to be shifted from low gear to second gear.

The transmissions of the two engines may be shifted merely by operation of main lever 35 to rotate the propeller shafts 27 and 29 in either direction and at any determined speed relative to the speed of the two engines.

It will be seen that as the main gear shift lever 35 is shifted, both gear shift levers 31 and 32 will be simultaneously shifted and that the levers 31 and 32 will operate correspondingly to shift the gears in the two engines. No special construction of gear shifts or transmission mechanism for the two engines will be required, it being possible to use standard and similar gear shifts and transmission mechanisms for both engines. The transmissions of both engines will be simultaneously shifted to operate the forward and rear wheels of the vehicle in the same direction and to cause the forward wheels to be driven in the same gear ratio relative to the rearwardly facing engine 24 that the rear wheels are driven relative to the forwardly facing engine 23.

Although the mechanism for transmitting a combined sliding and rotary motion from one shaft to another shaft in an inverse direction is used in association with the other parts here described for shifting the two transmissions of a pair of oppositely disposed engines, it will be seen that this same mechanism can be used as a mechanical movement in a great many different relations wherever such a movement is desired.

When in use, the casing 41 will be filled with oil to minimize the friction of the moving parts therein. A drain opening and plug may be provided in the bottom of the casing. It is, of course, quite possible to substitute ordinary circular gears or other types of gears for the segment gears 46. Segment gears are preferred in the construction illustrated inasmuch as they take up less space than circular gears and the rotating movements of the two shafts 43 and 44 is but slight. It is of course possible to vary the degree of rotation imparted to the shaft 44 when the shaft 43 is rotated by varying the relative sizes of the two gears 46. The distance that the shaft 44 will slide when the shaft 43 is slid may be varied by pivoting the shipper lever 49 at other points than midway between the two shafts. Also the direction in which the shaft 44 will slide when the shaft 43 is slid may be easily varied by substituting a lever of the second or third class for the lever 53 of the first class, illustrated.

It will, of course, be understood that various changes may be made in the form, details, arrangement and proportions of the various parts without departing from the scope of the present invention.

What is claimed is:—

1. In a wheeled vehicle, the combination of an engine adapted to drive the rear wheels of the vehicle, an engine adapted to drive the front wheels of the vehicle, a variable speed transmission for each of said engines, a pair of shifting levers fulcrumed for universal pivotal motion for respectively shifting said transmissions, a controlling lever fulcrumed for universal pivotal motion and means for transmitting the motion imparted to said controlling lever to said shifting levers to impart universal pivotal motion to said levers to operate the same simultaneously and correspondingly in inverse directions.

2. In a wheeled vehicle, the combination of two oppositely disposed engines adapted to respectively drive the rear wheels and the front wheels of the vehicle, a pair of variable speed transmissions for said two engines, a pair of shifting members fulcrumed for universal pivotal motion for shifting said two transmissions, a pair of spaced parallel shafts mounted for both sliding and rotating movement, a controlling mechanism for imparting both sliding and rotary motion to one of said shafts, means operative between said shafts to impart sliding and rotary movement from the shaft moved by said controlling mechanism to the other shaft in an inverse direction and means for transmitting the resultant compound motion of each shaft to one of said shifting members to impart universal pivotal movement to the two shifting members simultaneously and similarly but in inverse directions as said controlling mechanism is operated.

3. In a wheeled vehicle, the combination of two oppositely disposed engines adapted to respectively drive the rear wheels and the front wheels of the vehicle, a pair of variable speed transmissions for said two engines, a pair of shifting members fulcrumed for universal pivotal motion for shifting said two transmissions, a pair of spaced parallel shafts mounted for both sliding and rotating movement, a controlling mechanism for imparting both sliding and rotary motion to one of said shafts, a pair of gears secured to said shafts and in mesh with each other, a shipping lever pivoted in the plane of said shafts between the same and operatively connected at the two sides of its pivot to said shafts, and means for transmitting the resultant compound motion of each shaft to one of said shifting members to impart universal pivotal movement to the two shifting levers and to move the two shifting members simultaneously and similarly but in inverse directions as said controlling mechanism is operated.

4. In a wheeled vehicle, the combination of two oppositely disposed engines adapted to respectively drive the rear wheels and the front wheels of the vehicle, a pair of variable speed transmissions for said two engines, a pair of shifting members for shifting said two transmissions, a pair of spaced parallel shafts mounted for both sliding and rotating movement, a controlling mechanism for imparting both sliding and rotary motion to one of said shafts, means operative between said shafts to impart sliding and rotary movement from said shaft moved by said controlling mechanism to the other shaft in an inverse direction, a second pair of shafts mounted for rotary and sliding movement and extending respectively at substantially right angles to said first mentioned shafts, means for connecting said last mentioned shafts respectively to said first mentioned shafts, so that said last mentioned shafts will be rotated and slid as said first mentioned shafts are slid and rotated and means for transmitting the resultant compound movement of said last mentioned shafts to said shifting members to move the two shifting members simultaneously and similarly but in reverse directions as said controlling mechanism is operated.

5. In a wheeled vehicle, the combination of two oppositely disposed engines adapted to respectively drive the rear wheels and the front wheels of the vehicle, a pair of variable speed transmissions for said two engines, a pair of shifting members for shifting said two transmissions, a pair of spaced parallel shafts mounted for both sliding and rotating movement, a controlling mechanism for imparting both sliding and rotary motion to one of said shafts, means operative between said shafts to impart sliding and rotary movement from said shaft moved by said controlling mechanism to the other shaft in an inverse direction, a second pair of shafts mounted for rotary and sliding movement and extending respectively at right angles to said first mentioned shafts, pairs of arms on said first mentioned and last mentioned shafts, the arms in each pair having ball and socket connection to transmit sliding and rotary motion from said first mentioned shafts to rotate and slide said last mentioned shafts and means for transmitting the movement of said last mentioned shafts respectively to said shifting members.

6. In a wheeled vehicle, the combination of two oppositely disposed engines adapted to respectively drive the rear wheels and front wheels of the vehicle, a pair of variable speed transmissions for said two engines, a pair of shifting members fulcrumed for universal pivotal motion for shifting said transmissions, a pair of spaced parallel shafts mounted for both sliding and rotary movement, a controlling mechanism for imparting both sliding and rotary motion to one of said shafts, means for imparting both sliding and rotary motion to the other of said shafts in an inverse direction as said shaft moved by said controlling mechanism is slid and rotated and means operative between respective shafts and shifting members to impart universal pivotal motion to the shifting members as the shafts are slid and rotated, the motion imparted to one of said shifting members being in inverse direction to the motion imparted to the other of said shifting members, whereby both transmissions can be simultaneously and similarly shifted.

7. In a wheeled vehicle, the combination of two oppositely disposed engines adapted to respectively drive the rear wheels and the front wheels of the vehicle, a pair of variable speed transmissions for said two engines, a pair of shifting levers fulcrumed for universal pivotal motion for shifting said transmission, a pair of spaced parallel substantially longitudinal extending shafts mounted for both sliding and rotating movement, a controlling mechanism for imparting both sliding and rotary movement to one of said shafts, a pair of segment gears carried by said shafts and in mesh with each other a shipper lever pivoted between said shafts for swinging movement in the plane of said shafts and operatively connected at the two sides of its pivot to said shafts, a pair of substantially transversely extending shafts mounted for both rotary and sliding movement, pairs of arms carried by said first mentioned and last mentioned shafts, the arms in each pair being connected together by ball and socket joints, and said pairs of arms being adapted to transmit rotary and sliding movement to said last mentioned shafts from said first mentioned shafts, and arms carried by said last mentioned shafts and having ball and socket connections with said shifting levers.

8. The structure defined in claim 7, said controlling means including a main controlling lever fulcrumed for universal pivotal motion at the forward portion of the vehicle, a rod extending substantially longitudinally of the vehicle and mounted for sliding and rotary movement and a pair of arms carried by said main controlling lever and said rod and having ball and socket connection with each other.

9. In a wheeled vehicle, the combination of an engine adapted to drive the rear wheels of the vehicle, an engine adapted to drive the front wheels of the vehicle, a variable speed transmission for each of said engines, a pair of shifting levers fulcrumed for universal pivotal motion for respectively shifting said transmissions, and means for simultaneously imparting universal pivotal motion to said levers to operate the same correspondingly in inverse directions.

In testimony whereof we affix our signatures.

PETER S. ECKLAND.
GUNNAR RYDEN.